United States Patent
Goldberg

(10) Patent No.: US 6,205,261 B1
(45) Date of Patent: Mar. 20, 2001

(54) CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE

(75) Inventor: Randy G. Goldberg, Princeton, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/018,575

(22) Filed: Feb. 5, 1998

(51) Int. Cl.⁷ .............................. G06K 9/00; G06K 9/03; G10L 15/00

(52) U.S. Cl. .................. 382/310; 382/187; 382/189; 382/309; 704/251

(58) Field of Search ..................... 382/187, 159, 382/228, 309, 310, 227, 189, 181; 704/251

(56) References Cited

U.S. PATENT DOCUMENTS

| | | | |
|---|---|---|---|
| 3,988,715 | 10/1976 | Mullan et al. ........................ | 382/228 |
| 4,718,102 | * 1/1988 | Crane et al. ........................ | 382/185 |
| 4,783,804 | 11/1988 | Juang et al. ........................ | 704/245 |
| 4,817,156 | 3/1989 | Bahl et al. ........................ | 704/256 |
| 4,819,271 | 4/1989 | Bahl et al. ........................ | 704/256 |
| 4,908,865 | 3/1990 | Doddington et al. ................ | 704/272 |
| 5,023,912 | 6/1991 | Segawa ............................... | 381/43 |
| 5,027,406 | 6/1991 | Roberts et al. ...................... | 381/43 |
| 5,034,989 | 7/1991 | Loh .................................... | 382/189 |
| 5,050,215 | 9/1991 | Nishimura .......................... | 704/244 |
| 5,101,345 | 3/1992 | MacPhail ............................ | 707/1 |
| 5,125,022 | 6/1992 | Hunt et al. .......................... | 379/88 |
| 5,127,043 | 6/1992 | Hunt et al. .......................... | 379/88 |
| 5,167,016 | 11/1992 | Bagley et al. ...................... | 395/144 |
| 5,179,718 | 1/1993 | MacPhail ............................ | 707/514 |
| 5,216,720 | 6/1993 | Naik et al. .......................... | 704/272 |
| 5,255,310 | 10/1993 | Kim et al. ........................... | 379/88 |
| 5,274,560 | 12/1993 | LaRue ................................ | 364/444 |
| 5,283,833 | 2/1994 | Church et al. ...................... | 381/41 |
| 5,297,194 | 3/1994 | Hunt et al. .......................... | 379/88 |
| 5,303,299 | 4/1994 | Hunt et al. .......................... | 379/88 |
| 5,365,574 | 11/1994 | Hunt et al. .......................... | 379/88 |
| 5,384,833 | 1/1995 | Cameron ............................ | 704/275 |
| 5,418,717 | 5/1995 | Su et al. ............................ | 364/419.08 |
| 5,452,397 | 9/1995 | Ittycheriah et al. ................. | 395/2.49 |
| 5,454,062 | 9/1995 | LaRue ................................ | 395/2.63 |
| 5,455,889 | 10/1995 | Bahl et al. .......................... | 704/236 |
| 5,465,290 | 11/1995 | Hampton et al. ................... | 379/88.02 |
| 5,497,319 | 3/1996 | Chong et al. ....................... | 364/419.02 |
| 5,499,288 | 3/1996 | Hunt et al. .......................... | 379/88 |
| 5,502,774 | 3/1996 | Bellegarda et al. ................. | 382/159 |
| 5,504,805 | 4/1996 | Lee .................................... | 379/67 |

(List continued on next page.)

FOREIGN PATENT DOCUMENTS

| | | |
|---|---|---|
| 0 319 193 A2 | 6/1989 | (EP) . |
| WO 96/10795 | 4/1996 | (WO) . |
| 96 36042 | 11/1996 | (WO) . |

Primary Examiner—Phuoc Tran
Assistant Examiner—Daniel G. Mariam
(74) Attorney, Agent, or Firm—Kenyon & Kenyon

(57) ABSTRACT

A method and apparatus for correcting misrecognized words appearing in electronic documents that have been generated by scanning an original document in accordance with an optical character recognition ("OCR") technique. If an incorrect word is found in the electronic document, the present invention generates at least one reference word and selects the reference word that is the most likely correct replacement for the incorrect word. This selection is accomplished by comparing each character member of every reference word to a plurality of confusion sets. On the basis of this comparison, the reference words are reduced to a smaller candidate set of reference words, from which a reference word for replacing the incorrect word is selected on the basis of predetermined criteria.

44 Claims, 9 Drawing Sheets

U.S. PATENT DOCUMENTS

| | | | |
|---|---|---|---|
| 5,509,104 | 4/1996 | Lee et al. | 395/2.65 |
| 5,517,558 | 5/1996 | Schalk | 379/88 |
| 5,519,786 | 5/1996 | Courtney et al. | 382/159 |
| 5,526,465 | 6/1996 | Carey et al. | 704/250 |
| 5,535,120 | 7/1996 | Chong et al. | 364/419.03 |
| 5,566,272 | 10/1996 | Brems et al. | 704/231 |
| 5,577,164 | 11/1996 | Kaneko et al. | 704/275 |
| 5,613,109 | 3/1997 | Yamauchi et al. | 707/104 |
| 5,623,578 | 4/1997 | Mikkilineni | 704/255 |
| 5,623,609 | 4/1997 | Kaye et al. | 704/1 |
| 5,640,490 | 6/1997 | Hansen et al. | 704/254 |
| 5,642,519 | 6/1997 | Martin | 704/9 |
| 5,655,058 | 8/1997 | Balasubramanian et al. | 704/236 |
| 5,675,647 | 10/1997 | Garneau et al. | 380/20 |
| 5,675,704 | 10/1997 | Juang et al. | 704/246 |
| 5,675,706 | 10/1997 | Lee et al. | 704/256 |
| 5,677,990 | 10/1997 | Junqua | 704/255 |
| 5,680,509 | 10/1997 | Gopalakrishnan et al. | 704/270 |
| 5,680,511 | 10/1997 | Baker et al. | 395/2.66 |
| 5,687,287 | 11/1997 | Gandhi et al. | 704/247 |
| 5,729,656 | 3/1998 | Nahamoo et al. | 704/254 |
| 5,745,555 | 4/1998 | Mark | 379/93.03 |
| 5,748,840 | 5/1998 | La Rue | 704/254 |
| 5,754,695 * | 5/1998 | Kuo et al. | 382/228 |
| 5,764,799 | 6/1998 | Hong et al. | 382/225 |
| 5,769,527 | 6/1998 | Taylor et al. | 362/85 |
| 5,781,882 | 7/1998 | Davis et al. | 704/221 |
| 5,794,042 | 8/1998 | Terada et al. | 395/701 |
| 5,797,123 | 8/1998 | Chou et al. | 704/256 |
| 5,799,269 * | 8/1998 | Schabel et al. | 704/9 |
| 5,802,205 * | 9/1998 | Errico et al. | 382/187 |
| 5,806,040 | 9/1998 | Vensko | 704/273 |
| 5,818,952 * | 10/1998 | Takenouchi et al. | 382/309 |
| 5,829,000 | 10/1998 | Huang et al. | 704/252 |
| 5,841,901 * | 11/1998 | Arai et al. | 382/309 |
| 5,850,480 * | 12/1998 | Scanlon | 382/187 |
| 5,870,492 * | 2/1999 | Shimizu et al. | 382/187 |
| 5,875,108 | 2/1999 | Hoffberg et al. | 364/146 |
| 5,889,897 | 3/1999 | Medina | 382/309 |
| 5,903,864 | 5/1999 | Gadbois et al. | 704/251 |

\* cited by examiner

CONFUSION SET 1: A, H, K, M, N, X, Y, ITI
CONFUSION SET 2: B, D, R, P, 8, 3, E, F, 5, I3, IO, LO
CONFUSION SET 3: O, Q, G, C, J, 6, 0, 9
CONFUSION SET 4: S, Z, 2
CONFUSION SET 5: U, W, V, VV, UU
CONFUSION SET 6: I, L, 7, 1, T
CONFUSION SET 7: 4

FIG. 4

|   | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| A |   |   |   |   |   |   |   |   |   | 1 | 1 |   |   |   |   |   |   |   |   |   |   |   |   |   |   |   |
| B |   |   | 1 | 1 | 1 |   |   |   |   |   |   |   |   |   |   | 1 |   |   | 1 |   |   | 1 |   |   |   |   |
| C |   | 1 |   | 1 | 1 |   |   |   |   |   |   |   |   |   |   | 1 |   |   | 1 |   |   | 1 |   |   |   |   |
| D |   | 1 | 1 |   | 1 |   |   |   |   |   |   |   |   |   |   | 1 |   |   | 1 |   |   | 1 |   |   |   |   |
| E |   | 1 | 1 | 1 |   |   |   |   |   |   |   |   |   |   |   | 1 |   |   | 1 |   |   | 1 |   |   |   |   |
| F |   |   |   |   |   |   |   |   |   |   |   |   |   |   |   |   |   |   | 1 |   |   |   |   | 1 |   |   |
| G |   |   |   |   |   |   |   |   |   |   |   |   |   |   |   |   |   |   |   |   |   |   |   |   |   |   |
| H |   |   |   |   |   |   |   |   |   |   |   |   |   |   |   |   |   |   |   |   |   |   |   |   |   |   |
| I |   |   |   |   |   |   |   | 1 |   |   |   |   |   | 1 |   |   | 1 |   |   |   |   |   |   |   |   |   |
| J | 1 |   |   |   |   |   |   |   |   |   |   | 1 |   |   |   |   |   |   |   |   |   |   |   |   |   |   |
| K | 1 |   |   |   |   |   |   |   |   |   |   |   |   |   |   |   |   |   |   |   |   |   |   |   |   |   |
| L |   |   |   |   |   |   |   | 1 | 1 |   |   |   |   |   |   | 1 | 1 |   |   |   |   |   |   |   |   |   |
| M |   |   |   |   |   |   |   |   |   |   |   | 1 |   |   |   |   |   |   |   |   |   |   |   |   |   |   |
| N |   |   |   |   |   |   |   |   |   |   |   |   | 1 |   |   |   |   |   |   |   |   |   |   |   |   |   |
| O |   |   |   |   |   |   |   | 1 |   |   | 1 |   |   |   |   |   |   | 1 |   |   |   |   |   |   |   |   |
| P |   | 1 | 1 | 1 |   |   |   |   |   |   |   |   |   |   |   |   |   |   | 1 | 1 |   |   |   |   |   |   |
| Q |   |   |   |   |   |   |   | 1 |   |   | 1 |   |   | 1 |   |   |   |   |   |   |   |   |   |   |   |   |
| R |   |   |   |   |   |   |   | 1 |   |   | 1 |   |   | 1 |   |   |   |   |   |   |   |   |   |   |   |   |
| S |   |   |   |   |   |   |   | 1 |   |   |   |   |   |   |   |   |   |   |   |   |   |   |   | 1 |   |   |
| T |   | 1 | 1 | 1 | 1 |   |   |   |   |   |   |   |   |   |   | 1 |   |   |   |   |   | 1 |   |   |   |   |
| U |   |   |   |   |   |   |   |   |   |   |   |   |   |   |   |   |   |   |   |   |   |   |   |   |   |   |
| V |   | 1 | 1 | 1 | 1 |   |   |   |   |   |   |   |   |   |   | 1 |   |   |   | 1 |   |   |   |   |   |   |
| W |   |   |   |   |   |   |   |   |   |   |   |   |   |   |   |   |   |   |   |   |   |   |   |   |   |   |
| X |   |   |   |   | 1 |   |   |   |   |   |   |   |   |   |   |   |   | 1 |   |   |   |   |   |   |   |   |
| Y |   |   |   |   |   |   |   |   |   |   |   |   |   |   |   |   |   |   |   |   |   |   |   |   |   |   |
| Z |   |   |   |   |   |   |   |   |   |   |   |   |   |   |   |   |   |   |   |   |   |   |   |   |   |   |

CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE

CROSS-REFERENCE TO RELATED APPLICATIONS

The present application is related to the following applications: U.S. patent application Ser. No. 08/763,382, filed Dec. 13, 1996, entitled "STATISTICAL DATABASE CORRECTION OF ALPHANUMERIC ACCOUNT NUMBERS FOR SPEECH RECOGNITION AND TOUCH-TONE RECOGNITION"; U.S. patent application Ser. No. 08/771,356, filed Dec. 16, 1996, now U.S. Pat. No. 6,061,654 issued May 9, 2000 entitled "CONSTRAINED ALPHANUMERICS FOR ACCURATE ACCOUNT NUMBER RECOGNITION"; U.S. patent application Ser. No. 08/909,199, filed Aug. 11, 1997, entitled "A CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE"; U.S. patent application Ser. No. 08/909,200, filed Aug. 11, 1997, entitled "METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM"; U.S. patent application Ser. No. 08/953,579, filed Oct. 17, 1997, entitled "METHOD AND APPARATUS FOR ACCESSING PREDEFINED GRAMMARS"; U.S. patent application Ser. No. 08/953,469, filed Oct. 17, 1997, entitled "METHOD AND APPARATUS FOR MINIMIZING GRAMMAR COMPLEXITY"; U.S. patent application Ser. No. 08/953,468, filed Oct. 17, 1997, entitled "METHOD AND APPARATUS FOR PERFORMING A GRAMMAR-PRUNING OPERATION"; U.S. patent application Ser. No. 08/975,587, filed Nov. 20, 1997, entitled "METHOD AND APPARATUS FOR PERFORMING A NAME ACQUISITION BASED ON SPEECH RECOGNITION"; U.S. patent application Ser. No. 08/975,588, filed Nov. 20, 1997, entitled "CONFUSION SET-BASED METHOD AND APPARATUS FOR PRUNING A PREDETERMINED ARRANGEMENT OF INDEXED IDENTIFIERS"; U.S. patent application Ser. No. 08/975,589, filed Nov. 20, 1997, entitled "CHECKSUM BASED METHOD AND APPARATUS FOR PERFORMING SPEECH RECOGNITION"; U.S. patent application Ser. No. 08/928,678, filed Dec. 2, 1997 now U.S. Pat. No. 5,980,152 issued Nov. 9, 1999, entitled "METHOD AND APPARATUS FOR ACCESSING A SYSTEM ON THE BASIS OF PLURAL MATCHING OPERATIONS"; and U.S. patent application Ser. No. 09/018,449, entitled "STATISTICAL OPTION GENERATOR FOR ALPHA-NUMERIC PRE-DATABASE SPEECH RECOGNITION CORRECTION," filed concurrently herewith and assigned to a common assignee.

BACKGROUND OF THE INVENTION

The present invention is directed to a method and system for correcting misrecognized words in electronic documents that have been produced by an optical character recognition system that scans text appearing on a physical medium, and in particular, to a method and system that relies on a plurality of confusion sets to select a replacement word for each misrecognized word in the document.

Devices that are used in conjunction with optical character recognition ("OCR") techniques have been in use for some time. Examples of such devices are optical scanners and facsimile machines. What is common to both of these types of devices is that they each scan a physical document bearing printed or handwritten characters in order to produce an electronic image of the original document. The output image is then supplied to a computer or other processing device, which performs an OCR algorithm on the scanned image. The purpose of the OCR algorithm is to produce an electronic document comprising a collection of recognized words that are capable of being edited. The electronic document may be formatted in any one of a plurality of well known applications. For example, if the recognized words are to be displayed on a computer monitor, they may be displayed as a Microsoft WORD® document, a WORDPERFECT® document, or any other text-based document. Regardless of how the recognized words of the electronic document are formatted, the recognized words are intended to correspond exactly, in spelling and in arrangement, to the words printed on the original document.

Such exact correspondence, however, does not always occur; as a result, the electronic document may include misrecognized words that never appeared in the original document. For purposes of this discussion, the term "word" covers any set of characters, whether or not the set of characters corresponds to an actual word of a language. Moreover, the term "word" covers sets of characters that include not only letters of the alphabet, but also numbers, punctuation marks, and such typographic symbols as "$", "&", "#", etc. Thus, a misrecognized word may comprise a set of characters that does not comprise an actual word, or a misrecognized word may comprise an actual word that does not have the same spelling as that of the corresponding word in the scanned document. For example, the word "got" may be misrecognized as the non-existent word "qot", or the word "eat" may be recognized as "cat." Such misrecognized words, whether they comprise a real word or a mere aggregation of characters, may be quite close in spelling to the words of the original document that they were intended to match. The cause of such misrecognition errors is largely due to the physical similarities between certain characters. For example, as discussed above, such errors may occur when the letter "g" is confused with the physically similar letter "q". Another common error that OCR algorithms make is confusing the letter "d" with the two-letter combination of "ol." The physical resemblance of certain characters is not the only cause of recognition errors, however. For example, the scanning device may include a faulty optical system or a defective charge-coupled device (CCD); the original document may be printed in a hard-to-scan font; or the original document may include scribbles and marks that obscure the actual text.

Certain techniques have been implemented to detect and correct such misrecognition errors. For example, if the electronic document containing the recognized words is formatted in a word processing application, a user viewing the document may use the spell checking function provided by the word processing application to correct any words that have been misspelled. Some of these word processing applications also provide a grammar checker, which would identify words that, although spelled correctly, do not belong in the particular sentences in which they appear.

A drawback to these techniques is that a user must manually implement these correction techniques because spell checkers and grammar checkers operate by displaying to the user a list of possible words that may include the correct word. By manipulating an appropriate sequence of keys or other data input means, a user must select from this list what he believes to be the correct word and implement the appropriate commands for replacing the misrecognized word with the selected word. Such a correction technique is time-consuming, and moreover, is prone to human error because, in carrying out such operations, the user may inadvertently select an inappropriate word to replace the misrecognized word. What is therefore needed is a correction technique that automatically replaces each misrecognized word with the word most likely matching the corresponding word in the original document. Such a correction technique would not require user intervention.

SUMMARY OF THE INVENTION

In order to overcome the above-mentioned disadvantages found in previous techniques for correcting misrecognized words, the present invention is directed to a method and apparatus that automatically substitutes each misrecognized word with a dynamically generated replacement word that has been determined to be the most likely correct word for replacing the misrecognized word. The recognized words may be based on words appearing on a physical medium (e.g., a sheet of paper) that has been optically scanned. The present invention then determines whether each recognized word is correct by executing either a spell checking algorithm, a grammar checking algorithm, a natural language algorithm, or any combination thereof. For each incorrect recognized (i.e., misrecognized) word, the present invention generates at least one reference word; the misrecognized word is replaced by one of the reference words. In order to determine which reference word is to replace the misrecognized word, the present invention provides a plurality of confusion sets. Each confusion set includes constituent elements, otherwise referred to as character members, which correspond not only to individual characters, but also to multi-character combinations. The purpose of grouping together these character members in different confusion sets is to group together those character members having a relatively high probability of being confused with each other by the OCR application. The manner in which these confusion sets are generated is such that characters or character combinations from different confusion sets have a relatively low probability of being confused with each other. The determination of which characters should be grouped together is based on the recognition probabilities arranged in a confusion matrix.

Based on the provided confusion sets, the present invention compares each character sequence of the misrecognized word with a corresponding character sequence of each reference word to determine which corresponding character sequences do not include the same character members. If a character sequence of a reference word includes a character member that is different than the character member in the corresponding character sequence of the misrecognized word, then that reference word will be eliminated from further consideration if the differing character members in the misrecognized word and reference word are not from the same confusion set. The remaining non-eliminated reference words are referred to collectively as a set of candidate reference words; the present invention reduces the set of candidate reference words to a single reference word in accordance with a set of predetermined criteria and then replaces the misrecognized word with the reference word remaining in the set of candidate reference words.

BRIEF DESCRIPTION OF THE DRAWINGS

FIG. 4 illustrates a connectivity matrix from which a plurality of confusion sets is derived.

DETAILED DESCRIPTION

Figure 1:
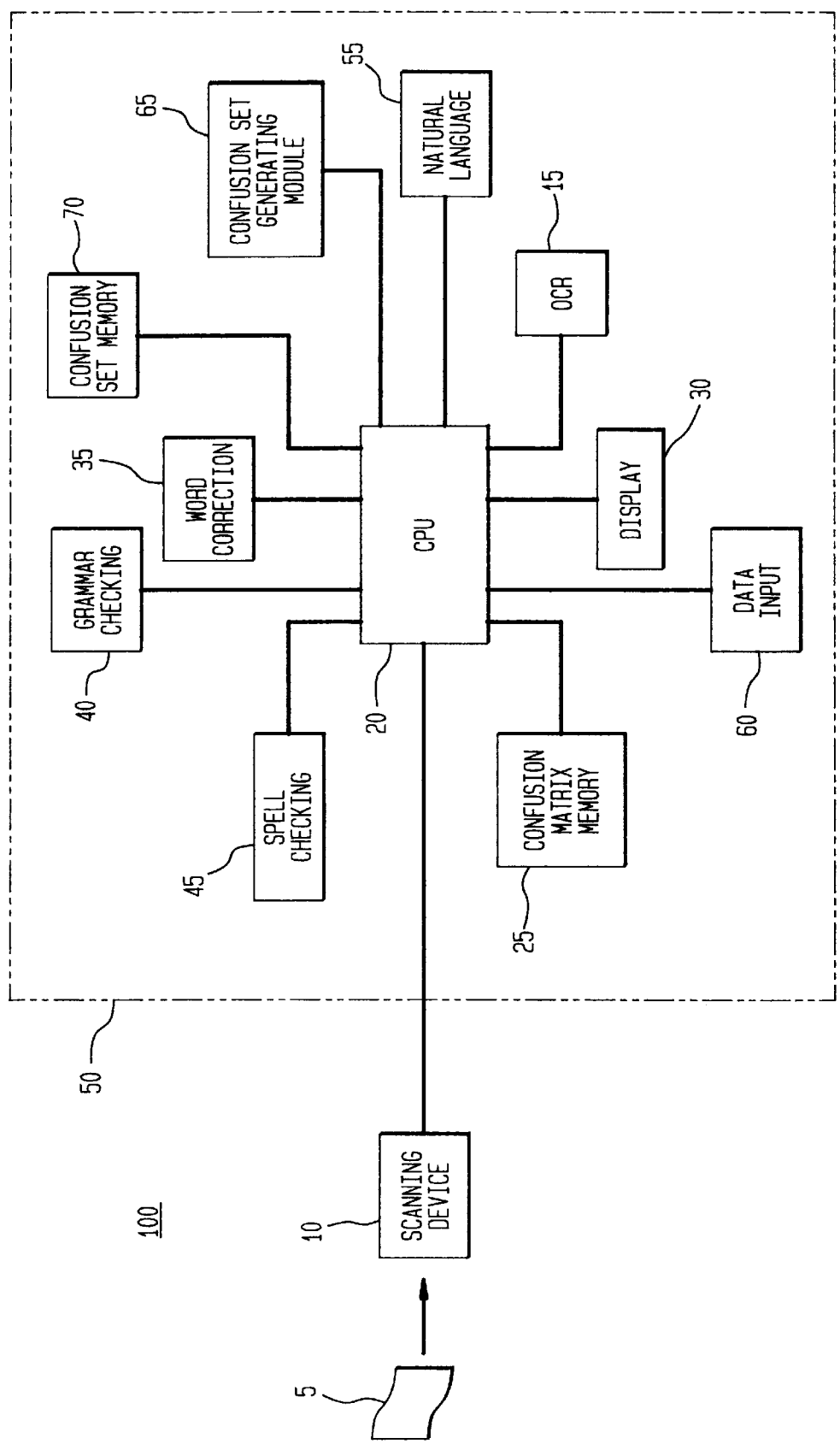
FIG. 1 illustrates a block diagram of an apparatus according to the present invention.

FIG. 1 illustrates a system 100 that implements the word correction routine of the present invention. The system of FIG. 1 is merely an example of one kind of system that is capable of supporting the present word correction routine, and it should be appreciated that the present word correction routine is compatible with numerous other applications.

The system 100 of FIG. 1 includes a document scanning device 10, which may comprise an optical scanner or a facsimile machine. Scanning device 10 scans an input original document 5 and generates an image signal that is representative of the characters appearing on document 5. Scanning device 10 supplies the image signal to processing device 50, which may comprise a general purpose computer. Processing device 50 may be located remotely from the scanning device 10, or processing device 50 and scanning device 10 may be integrated together into a unitary apparatus, depending on the particular needs and requirements of the application in which these devices are to be implemented.

Processing device 50 includes a central processing unit 20 ("CPU"). Associated with CPU 20 are a confusion matrix memory 25, a confusion set generating module 65, a confusion set memory 70, a display 30, an optical character recognition module 15, a data input device 60, a word correction module 35, a spell checking module 45, and, as an option, a grammar checking module 40 and a natural language understanding module 55. A user first inputs a document 5 into a scanning device 10, which scans the document 5 and generates an image signal representative of the scanned document. The image signal is then transmitted to CPU 20, which uses OCR module 15 to perform an optical character recognition algorithm on the received image signal. Currently, there are several software applications that can serve as OCR module 15; such software applications include, but are not limited to, Pages Pro 97™ by XEROX or Paper Port™ by VISIONEER. Although these specific applications recognize only printed characters, OCR module 15 is also capable of implementing applications that recognize handwritten text. After performing an OCR algorithm on the image signal, OCR module 15 creates an electronic document that includes recognized words intended to correspond exactly, in spelling and in arrangement, to the words of original document 5. CPU 20 may format the electronic document produced by OCR module 15 according to any one of a variety of applications. For instance, CPU 20 may format the electronic document as a WORDS® document, as a WORDPERFECT® document, or as any other text-based document. For a further discussion of word correcting algorithms for OCR applications, reference should be made to U.S. patent application Ser. No. 08/909,199 ("the '199 application"), which is hereby incorporated by reference.

Although the recognized words of the electronic document should match all the corresponding words of the original document 5, a complete match sometimes does not occur. CPU 20 determines if there are any incorrect words in the electronic document by using any suitable spell checking algorithm, grammar checking algorithm, or natural language algorithm, or any combination of the above. Any word in the electronic document that is flagged by one of these algorithms as incorrect is referred to as a misrecognized word. Each of these algorithms is capable of generating at least one alternative word for each incorrect word. These alternative words are referred to as reference words. After CPU 20 generates at least one reference word, CPU 20 implements the algorithm stored in word correction module 35 to select the reference word that is most likely the correct word for replacing the identified incorrect word. This selection is accomplished in accordance with the confusion sets maintained in confusion set memory 70; the generation of these confusion sets shall be explained hereafter. CPU 20 then replaces the incorrect word with the selected reference word.

Figure 2:
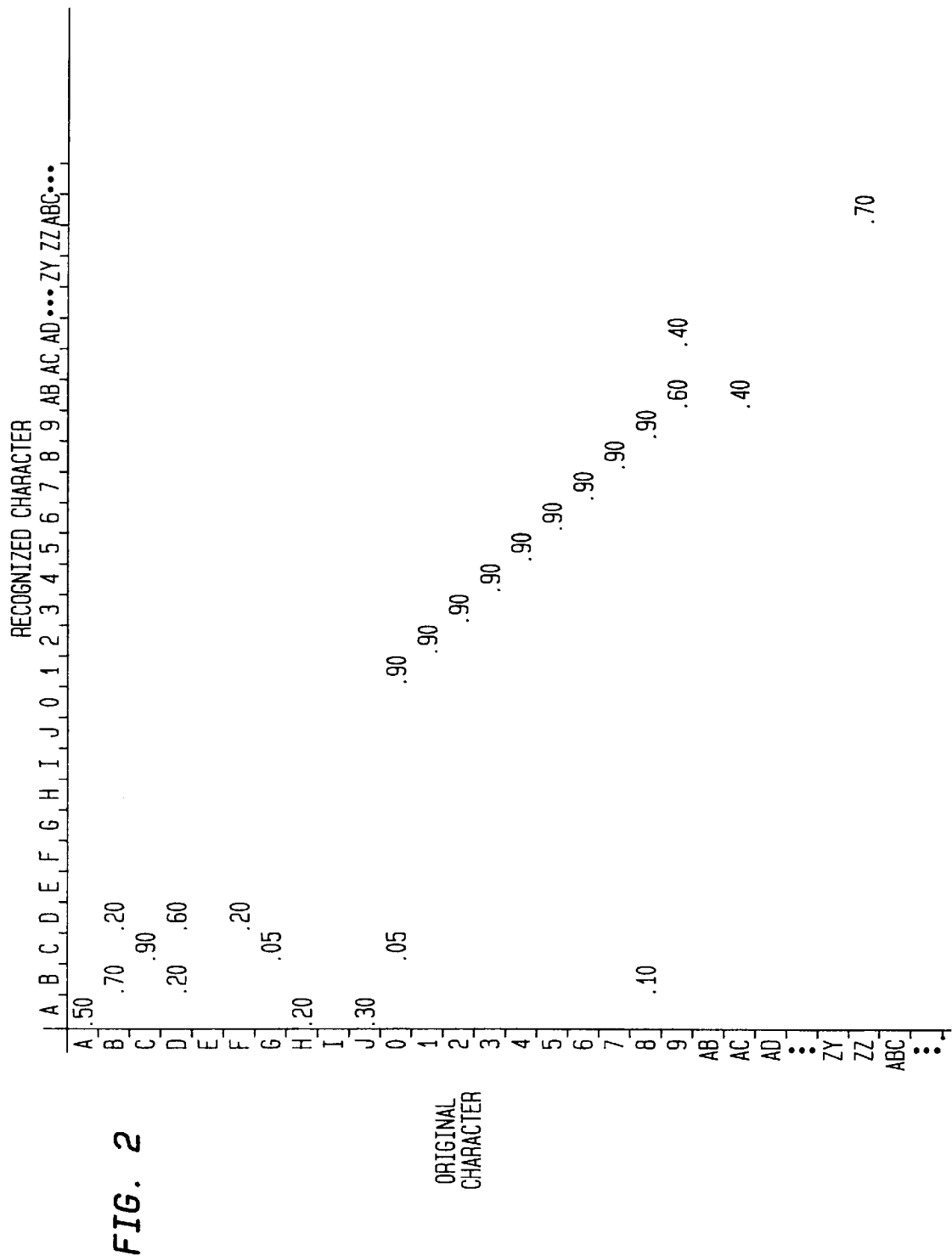
FIG. 2 illustrates a confusion matrix according to the present invention.

As explained above, the algorithm stored in word correction module 35 is carried out in accordance with the contents of confusion set memory 70. These confusion sets are generated in accordance with the contents of confusion matrix maintained in confusion matrix memory 35. To understand how these confusion sets are generated, it is helpful to understand confusion matrices. FIG. 2 illustrates an exemplary confusion matrix that may be used by CPU 20 to generate a plurality of confusion sets. Although in practice the confusion matrix stored in memory 25 would cover the entire alphabet, for the sake of simplicity and ease of understanding, the confusion matrix of FIG. 2 does not cover the entire alphabet; instead, this confusion matrix covers only the letters A–J, numerals 0–9, and certain bi-letter and tri-letter combinations, such as, for example "AB", "AC", "ABC", etc. This confusion matrix could be modified to accommodate punctuation or typographic characters, such as "$", "&", or "#". Moreover, in the example of FIG. 2, where no entry is provided, the blank entry should be read as a zero.

The confusion matrix of FIG. 2 is read as follows: the vertical columns correspond to characters of the reference words. The horizontal rows correspond to characters of words that are in original document 5. Of course, the confusion matrix of FIG. 2 may be configured in reverse, in which the horizontal rows correspond to characters of the reference words, and in which the vertical columns correspond to characters that are found in document 5. The values that are provided in the confusion matrix represent different probabilities. For example, based on the confusion matrix of FIG. 2, given that the letter "A" is present in a reference word, the probability that "A" is found in the same text position in the original document 5 is 50%. For the letter "A" in the reference word, there is also a probability of 20% that "H" appears in the corresponding text position in original document 5, and there is a probability of 30% that "J" appears in document 5 when "A" was recognized. The presence of the bi-letter and tri-letter combinations in the confusion matrix is an acknowledgment that, for example, certain single characters may be misrecognized as two or three letters, or vice versa, or that certain two letter combinations may be confused as other two or three letter combinations. For example, there is a chance that OCR module 15 may misrecognize the letter "d" as "ol," or the letter "w" as "uu."

The particular probabilities that are provided in FIG. 2 are determined in advance through experimentation, and they are tailored to suit the particular OCR module 15 that is used in the system of FIG. 1. Thus, before a particular OCR module is to be used in the system of FIG. 1, a confusion matrix corresponding to that particular OCR module must first be populated. This is done by having the OCR module recognize a test group of documents, all of which are available in their original forms as electronic documents. This test group of documents may number in the thousands, differing in fonts and other printing styles. A hard copy of each test document is printed out and supplied to a scanner, which then supplies an image signal based on the scanned hard copy to the OCR module. The OCR module generates an electronic document comprising a plurality of recognized words that is intended to match, in spelling and in arrangement, the words of the scanned hard copy of the test document.

At this point, there are two electronic documents, one comprising the original test document, and another corresponding to the text recognition output of the OCR module, which is intended to match the contents of the test document. In order to evaluate how well the electronic document generated by the OCR module matches the original test document, a well-known alignment algorithm is executed. The alignment algorithm determines where there is an exact correspondence between the two documents and where there is a mismatch. The types of mismatches that the alignment algorithm detects include those that result when the OCR module erroneously deletes a letter from or adds a letter to a word of the test document, or when the OCR module erroneously replaces a letter of an original word with another letter. For each row and column in the confusion matrix, the recognition errors are tallied and normalized in order to yield a set of probabilities, an example of which is illustrated in FIG. 2. Of course, other values or scores may be used in place of probabilities when populating a confusion matrix, so long as these values or scores are capable of representing the chance that one character or combination of characters has been recognized as itself or as another character or combination of characters. The different types of entries that can be entered into a confusion matrix may be referred to as character values or recognition probabilities.

Since different OCR modules exhibit different recognition accuracies, if OCR module 15 is to be replaced with a different OCR module, then a confusion matrix corresponding to the replacement OCR module must be populated and entered into memory 25. Or alternatively, memory 25 may store in advance a plurality of predetermined confusion matrices corresponding to different OCR modules, so that when a replacement OCR module is implemented, the corresponding confusion matrix may be selected by entering a command through input device 60. It should be noted that the probabilities (or other types of values) used to populate a confusion matrix need not be arranged in matrix form, but may be arranged as an array, or as any other data structure capable of associating a recognized and input character in terms of a probability.

Besides storing a plurality of confusion matrices corresponding to different OCR modules, confusion matrix memory 25 may also store a plurality of confusion matrices corresponding to a plurality of different fonts, including fonts relating to hand-written text. Having a different confusion matrix for each possible font is desirable because the recognition accuracy of a particular OCR module may vary depending on the font used to print the characters on the original document 5. As illustrated by the flow diagram of FIG. 3, OCR module 15 may be programmed to identify a font that is closest to the font of the printed characters appearing in document 5 (step 300). This ability to select a font closest to that of the scanned document is a feature that is common in OCR software. Based on the selected font, the word correction module 35 determines whether confusion matrix memory 25 stores a corresponding confusion matrix (step 310). If such a corresponding matrix is stored in confusion matrix memory 25, it is retrieved (step 320) and the probabilistic routine of word correction module 35 is implemented using this retrieved confusion matrix (step 340). If confusion matrix memory 25 does not store a confusion matrix corresponding to the selected font, then word correction module 35 retrieves from confusion matrix memory 25 a default confusion matrix (step 330), which is designed to exhibit the properties of a variety of fonts. The operation of the word correction module 35 then proceeds on the basis of this default confusion matrix (step 340).

Figures 3, 5:
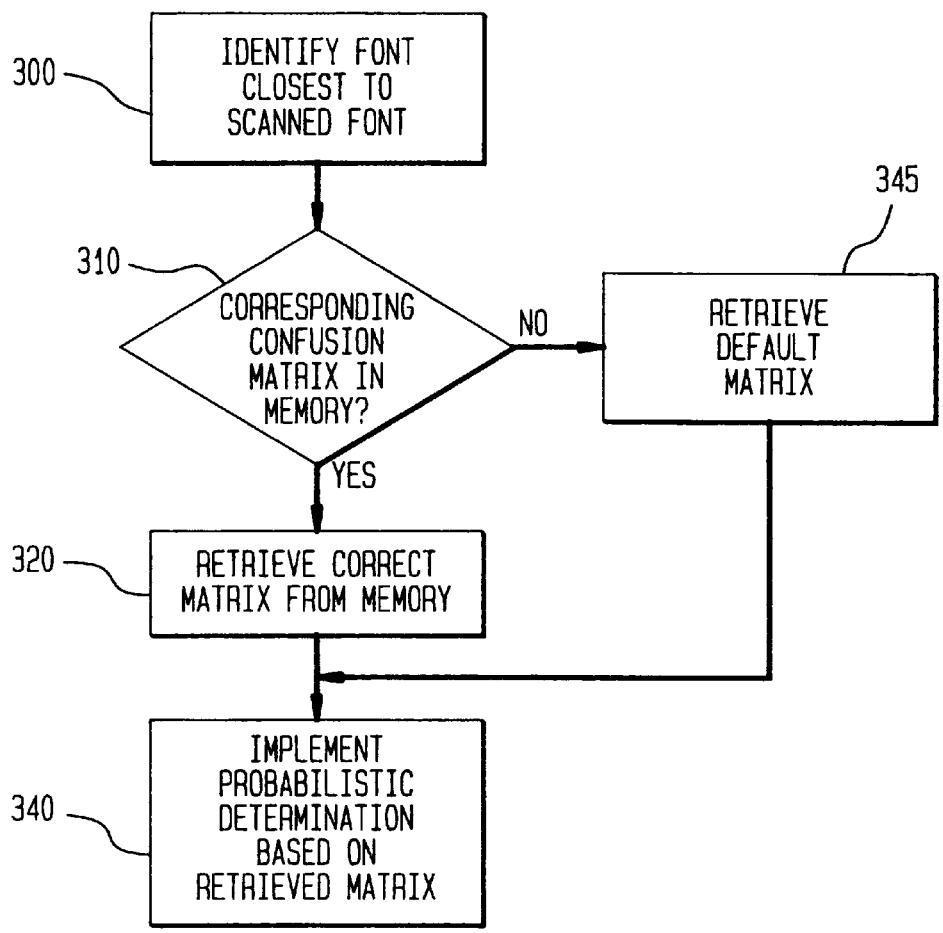
FIG. 3 illustrates a flow diagram for selecting a confusion matrix corresponding to the font of the words printed on a scanned document.
FIG. 5 illustrates a plurality of confusion sets.

In order to discuss the manner in which a plurality of confusion sets are generated, reference is now made to FIGS. 4 and 5. FIG. 4 illustrates what is referred to as a connectivity matrix, from which a plurality of confusion sets may be obtained. An example of a plurality of confusion sets is shown in FIG. 5. Each confusion set is intended to group together those characters and character combinations that are most likely to be confused with each other. Within the context of an optical recognition system, the characters that are most often confused with each other are the characters that look alike. As shall be seen in FIG. 5, the various constituent members of some of the confusion sets reflect the possibility not only of individual characters being confused with each other, but also the possibility of certain character combinations being confused with each other or with other individual characters. For example, the confusion sets reflect the possibility that the letter "B" may be confused with the character combination "I3." The manner in which these confusion sets are generated is such that characters or character combinations from different confusion sets have a relatively low probability of being confused with each other. As shall be explained in connection with FIG. 4, the determination of which characters should be grouped together is based on the recognition probabilities arranged in the confusion matrix of memory 25.

In order to simplify the terminology used to describe the contents of the confusion sets of FIG. 5, the elements of each confusion set are referred to as "character members"; this term may refer not only to individual characters, but also to character combinations as well. Thus, in FIG. 5, confusion set 1 groups together the character members "A", "H", "K", "M", "N", "X", "Y", and "ITI." Confusion set 2 groups together the character members "B", "D", "R", "P", "8","3", "E", "F", "5", "I3", "IO", and "LO". Confusion set 3 comprises the character members "O", "Q", "G", "C", "J", "6", "0", and "9". Confusion set 4 comprises the character members "S", "Z", and "2". Confusion set 5 comprises the character members "U", "W", "V", "VV", and "UU". Confusion set 6 comprises the character members "I", "L", "7", "1", and "T". Confusion set 7 comprises the character member "4". It should be appreciated that even though certain individual characters are repeated among multiple confusion sets, this does not violate the rule that no character members, as that term has been defined above, are to appear in more than one confusion set. Thus, the appearance of the letter O individually in confusion set 3 and as part of two character combinations (IO and LO) in confusion set 2 does not remove the unique constituency of each of these confusion sets because the uniqueness of each confusion set is determined at the character member level, not at the individual character level. As a consequence, the appearance of the character members "O", "IO", and "LO" does not render the associated confusion sets non-unique merely because each of these character members includes the letter "O". As explained above, the relevant criterion here is the makeup of each character member, which, since they are different from one another in this example, preserves the uniqueness of these confusion sets.

Operating in accordance with the instructions provided by confusion set generating module 65 and in accordance with the confusion matrix provided in memory 25, CPU 20 performs the necessary calculations and procedures for generating the confusion sets, and once generated, these confusion sets are maintained in memory 70. The first step in generating the confusion sets involves generating a matrix based on the confusion matrix that corresponds to the OCR algorithm currently in use. In particular, each entry location (i.e., the intersection point of row X with column Y) of the newly generated matrix is populated with a value of 1 if the same entry location in the confusion matrix is populated with a recognition probability that is greater than a predetermined threshold. For those entry locations of the confusion matrix having recognition probabilities that are less than or equal to the threshold, the corresponding entry locations of the newly generated matrix receive a value of 0. The threshold is determined empirically according to any suitable method, and it reflects the recognition characteristics of the OCR algorithm associated with the confusion matrix. The newly generated matrix that results from this procedure is a matrix that comprises only ones and zeroes. This matrix is then multiplied by itself a number of times equal to the amount of character members represented by the confusion matrix. Thus, if the confusion matrix covers only the alphabet, which includes twenty-six letters, without covering any character combinations, then the ones-and-zeroes matrix is multiplied by itself twenty-six times. The product of this multiplication is referred to as a connectivity matrix, an example of which is illustrated in FIG. 4.

The distribution of characters among the various confusion sets depends on the distribution of ones in the connectivity matrix. Everywhere in the connectivity matrix that there is a "one," the characters of the associated row and column are included in the same confusion set. For the sake of simplicity, since the particular confusion sets of FIG. 5 are quite broad in their coverage, the connectivity matrix from which these confusion sets were derived has not been provided in FIG. 4. Instead, the connectivity matrix of FIG. 4 is merely intended to illustrate how a particular plurality of confusion sets, one that in this example is less extensive than the one in FIG. 5, would be derived from a plurality of 1's that have been distributed in accordance to the procedure just described. It should be appreciated, however, that the confusion sets of FIG. 5 would be determined according to the same connectivity matrix procedure described in connection with FIG. 4. Alternatively, the composition of each confusion set may be determined empirically by having a programmer or a group of persons select which characters should be grouped together based on how similar in appearance the characters are perceived to be. The generation of confusion sets is also discussed in U.S. patent application Ser. No. 08/975,588, which is hereby incorporated by reference.

Referring to the example of FIG. 4, the column corresponding to the letter "A" includes a "one" at the rows corresponding to the letters "J" and "K". Thus, the letters "A", "J", and "K" are placed within one confusion set. For column "B", "ones" are associated with rows "C", "D", "E", "P", "T", and "V". Thus, the letters "B", "C", "D", "E", "P", "T", and "V" are included in another confusion set. This process is repeated until each character member represented in the original confusion matrix is associated with a confusion set.

It should be appreciated that this confusion set generation need not be performed after the system is put in practice, but instead may be accomplished before the system 100 begins interacting with users. Moreover, every time a new OCR algorithm is installed, and consequently, a new associated confusion matrix is activated, the system 100 requires a corresponding new plurality of confusion sets to be generated. Of course, each different plurality of confusion sets may be generated beforehand, so that if a new OCR algorithm is implemented in system 100, the appropriate plurality of confusion sets may be activated by entering a command through data input device 50. Further, the above-discussed procedure is not the only way to generate a plurality of confusion sets; the present invention is intended to encompass any suitable process for grouping the most often confused character members with one another. Thus, for example, had the system 100 been programmed to store recognition probabilities according to a data structure other than a confusion matrix, the present invention would encompass whatever technique is suitable for that data structure for determining which groups of character members are most often confused with one another by the OCR algorithm to be used.

Figure 6A:
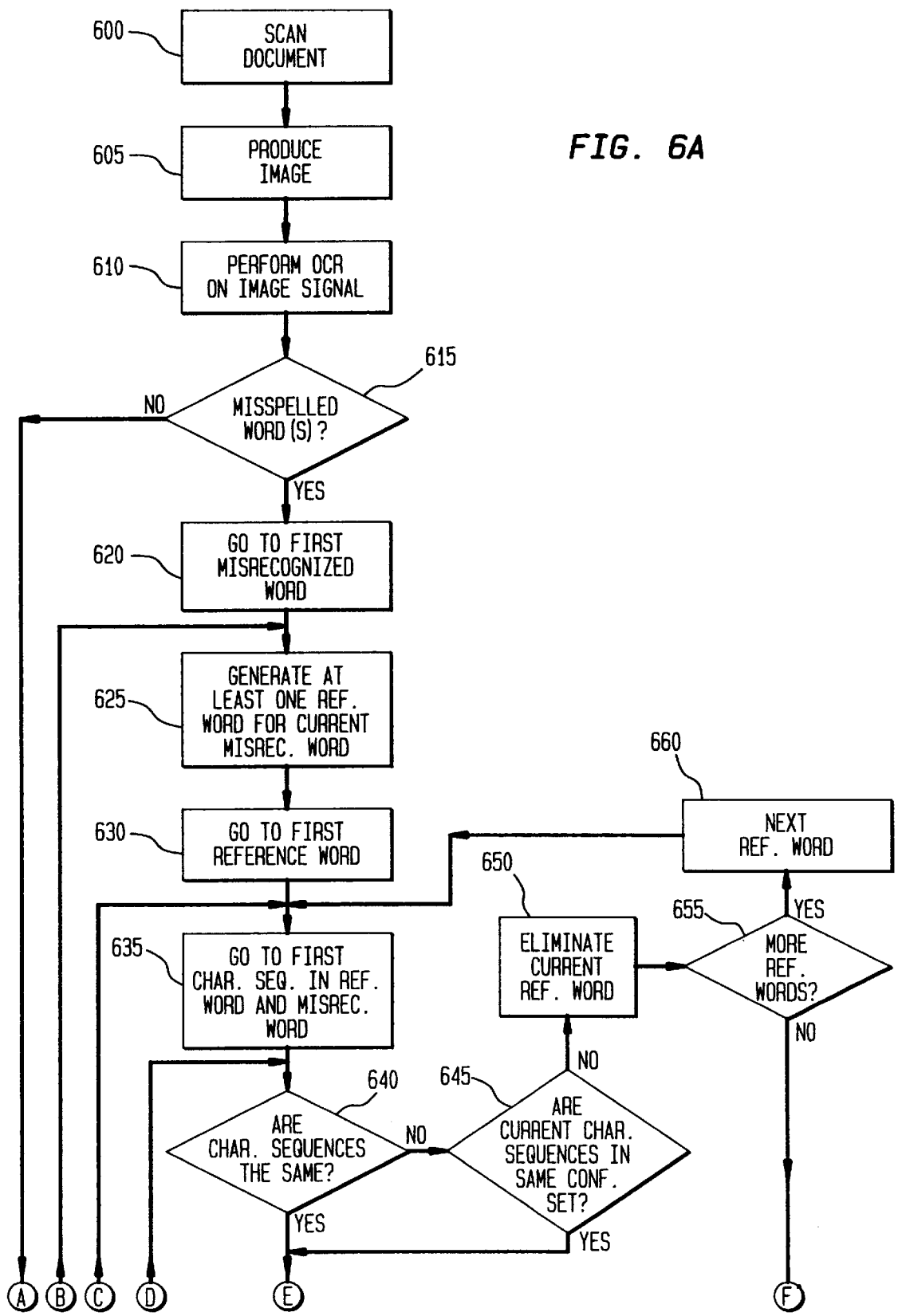
FIG. 6 illustrates a flow diagram for replacing a misrecognized word with a reference word according to a first embodiment of the present invention.
Figure 6B:
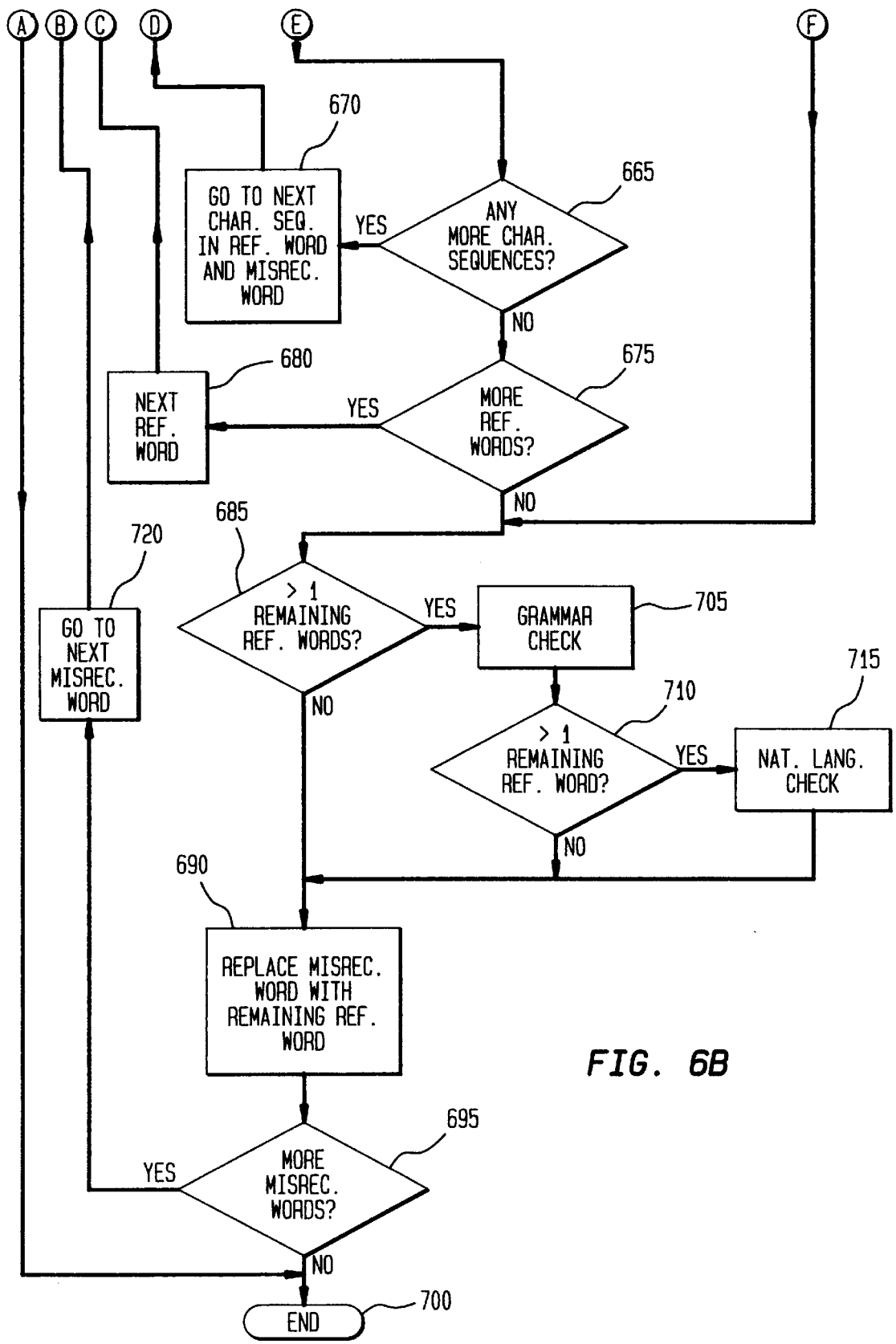
Figure 7A:
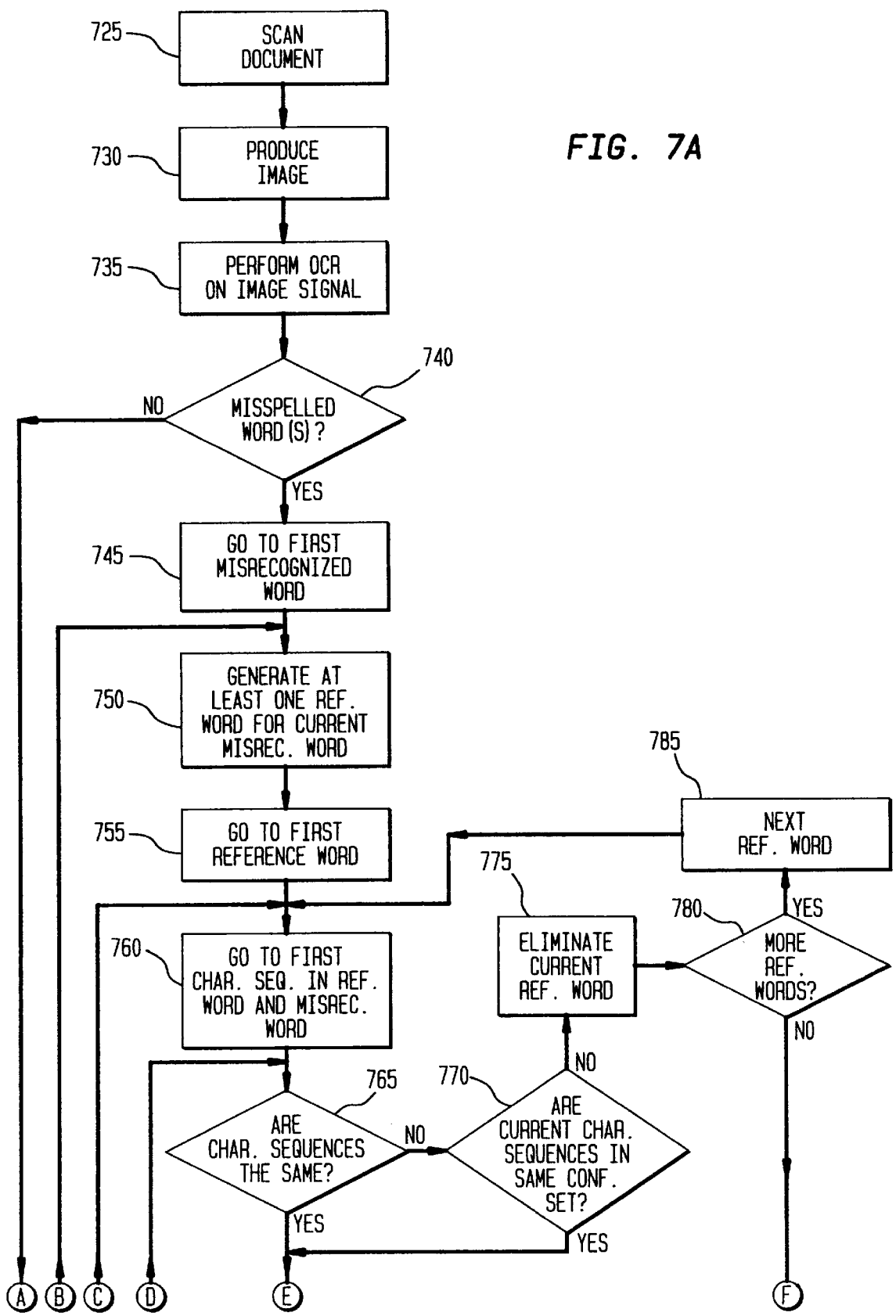
FIG. 7 illustrates a flow diagram for replacing a misrecognized word with a reference word according to a second embodiment of the present invention.
Figure 7B:
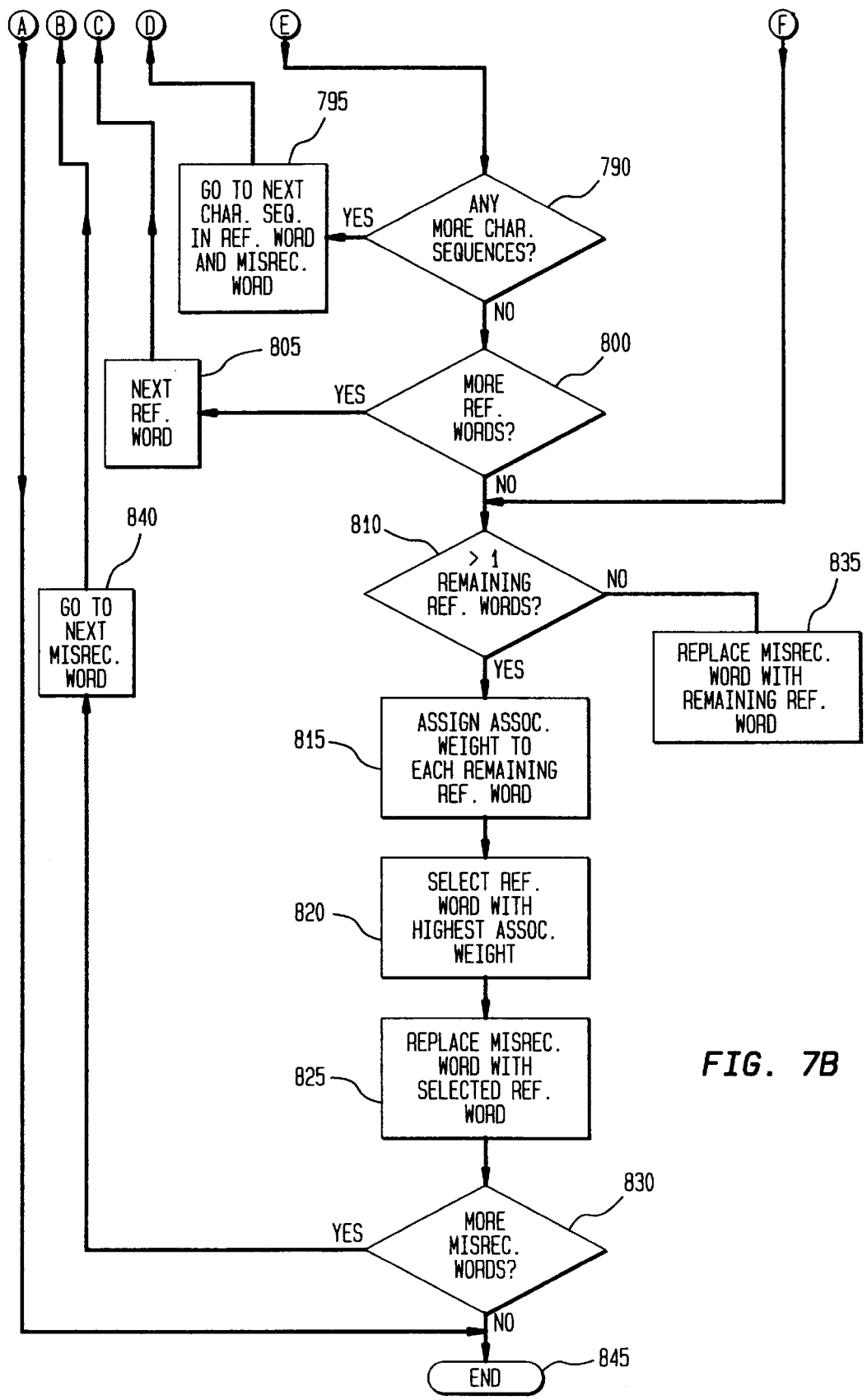

The flowcharts of FIGS. 6 and 7 illustrate the operation of CPU 20 in accordance with various word correcting algorithms stored in module 35. Depending on the particular implementation, CPU 20 may select among these stored routines either automatically or based on a command that is manually entered through data input device 60. FIG. 6 illustrates a flow diagram relating to one type of probabilistic determination performed by the present invention. First, an original document is scanned by scanning device 10 (step 600). The scanning device 10 generates an image signal that is intended to be a complete and accurate representation of the characters contained in the scanned document 5 (step 605). The image signal is relayed to processing device 50, and CPU 20 executes on the received image signal an OCR algorithm that is maintained in OCR module 15 (step 610). The OCR module 15 produces an electronic document comprising a plurality of words that are intended to match the words of the original document 5. CPU 20 then executes on the electronic document a spell checking algorithm maintained in module 45 (step 615), which determines if any words appearing in the electronic document have been misrecognized. The spell checking algorithm may correspond to the conventional spell checking functions that are available in such word processing applications as WORD® or WORDPERFECT®. Those spell checking functions typically compare each word in a document to a pre-stored dictionary of words. In most typical word processing applications, this dictionary is an English dictionary. In specialized applications, however, the dictionary may be supplemented with customized information such as account numbers. Accordingly an account number such as AB123C, although not comprising an actual English word, would be identified as a valid "word" by the spell checking algorithm if the account number was included in the algorithm dictionary. If a word in the electronic document does not match any word in the dictionary, the spell checking function generates from the dictionary at least one reference word that is similar in spelling to the word that is not in the dictionary. As stated above, in detecting misrecognized words, the present invention is capable of accomplishing this purpose not only through the use of a spell checking algorithm, but also through the use of any suitable grammar check algorithm or natural language algorithm, or any combination thereof to detect not only words that have been misspelled, but also words that do not make grammatical sense within the sentence in which they appear or words that do not fit the contextual sense of the sentence in which they appear. For example, in the sentence "I feet my dog today", the spell check algorithm would not flag any word as misrecognized because each word is correctly spelled, but the grammar check algorithm would flag the word "feet" as grammatically inappropriate because, based on the sentence structure, the word position occupied by the word "feet" should be occupied by a verb instead of a noun. Thus, by using a grammar check algorithm in conjunction with a spell check algorithm, the detected misrecognized words could cover not only misspelled words but also grammatically incorrect words as well. If a natural language algorithm were implemented as well, then the misrecognized words could cover words that, in spite of being correctly spelled and grammatically appropriate, would not make any contextual sense within the sentence in which they appear. For example, in a sentence reading "I took my bog for a walk today", the word "bog", while being a correctly spelled word, and as a nouon is a grammatically appropriate word, would nevertheless be flagged as a misrecognized word because the natural language algorithm would regard the word "bog" as contextually inappropriate in this sentence since its presence does not make any sense. Conventional grammar check and natural language algorithms are capable of generating a plurality of alternative reference words as well, usually by using the same procedure that spell checking algorithms use to generate alternative reference words.

Returning to FIG. 6, after identifying a misrecognized word in the electronic document, the spell checking algorithm generates at least one reference word, this reference word or words are words being those words that most closely match the spelling of the misrecognized word (step 615). If no word is identified as misrecognized, CPU concludes this operation (step 700). In generating these reference words, conventional spell checking algorithms employ a dictionary look-up procedure, according to which the spell checking algorithm selects from the above-mentioned pre-stored dictionary those words that are most similar in spelling to the misrecognized word. The grammar check algorithm and natural language algorithm can use this dictionary look-up procedure to generate reference words for grammatically or contextually incorrect words.

Assume that one of the words in the original document 5 is "bet," but that it has been misrecognized by the OCR module as "fet". Having identified "fet" as a misrecognized word (step 620) because it is misspelled, spell checking module 45 would then generate at least one reference word (step 625). In this example, assume that the generated reference words are "bet", "get," and "jet."

In typical spell checking operations, a user selects from the list of reference words the word he believes should replace the misrecognized word. This selection is performed manually, typically by manipulating a mouse or a sequence of keys on a keyboard. The system of the present invention eliminates this manual selection by automatically selecting, based on a confusion set-based operation, what word most likely is the best choice for replacing the misrecognized word. CPU 20 accomplishes this probabilistic determination by executing the algorithm stored in word correction module 35.

Returning to FIG. 6, CPU 20 goes to the first reference word, "bet" (step 630), and then CPU 20 goes to the first character sequence in the misrecognized and current reference words (step 635). The word correction module 35 is programmed to compare each character sequence in the reference word with a corresponding character sequence in the misrecognized word. Each character sequence comprises at least one character position. For example, if in the first iteration of this algorithm the character sequence length is set at two character positions for both the misrecognized word and the reference word, then CPU 20 would compare the character sequence "be", obtained from the current reference word, with the character sequence "fe", obtained from the current misrecognized word. As stated above, this multi-character combination is possible because the confusion sets have been generated to take into account character members comprising not only individual characters, but also bi- and tri-character combinations as well. Moreover, in practice, the present invention compares all possible character sequences of the reference word with all possible character sequences of the misrecognized word. Thus, for example, the first character in the recognized word may be compared to the first three characters of the reference word, or the first two characters of the recognized word may be compared to the first three characters of the reference word. The above example discussed in connection with FIG. 6 is merely an exemplary way of explaining the concept of comparing character sequences in the misrecognized word with character sequences of the reference word. For the sake of simplicity, assume that in this example CPU 20 is programmed to perform this operation on a character-by-character basis, so that each character sequence is one character in length. Thus, the first character of the misrecognized word "fet" is "f", and the first character in the first reference word "bet" is "b". CPU 20 determines whether these character sequences are the same (step 640). In this case they are not; therefore, CPU 20 next determines whether the current character sequences are from the same confusion set (step 645). If they are not, the current reference word is eliminated from further consideration (step 650). In order to understand the significance of the elimination step, it is useful to recall the fundamental purpose of confusion sets, namely, to group together those character combinations and individual characters that have greater than a certain chance of being confused for one another by an OCR algorithm for which the confusion sets were generated. Since the character members of confusion sets are organized according to this manner, it necessarily follows that character members from different confusion sets would have only a remote chance of being confused by the OCR algorithm. Therefore, by determining whether mismatched character members of corresponding character sequences from misrecognized and reference words are from the same confusion set, CPU 20 can eliminate those reference words having only a slight chance of actually being the correct word for which the misrecognized word may be substituted. After eliminating such a reference word, CPU 20 determines whether any more reference words have yet to be analyzed in this fashion (step 655). If more such reference words remain, CPU 20 goes onto the next reference word (step 660) and performs the same character sequence analysis described above.

If in steps 640 and 645 the character sequences are the same, or, if not, they at least belong to the same confusion set, then the current reference word is not eliminated on account of the current character sequence analysis. In the above-mentioned example, character sequence "f" and character sequence "b" are both in confusion set 2; therefore, the operation of CPU 20 determines whether any more character sequences have yet to be analyzed (step 665). In this case, the answer to this query is "yes"; therefore, CPU 20 proceeds to the next character sequence in both the misrecognized and reference words (step 670) and performs the same comparison described above. The next character sequence for both the misrecognized word and the reference word contains the same character, "e"; therefore, since a character member will by definition always be in the same confusion set as itself, CPU 20 will not eliminate the reference word "bet" on the basis of this latest character sequence.

After completing the analysis of steps 635–670 for a particular reference word, the CPU 20 will have either eliminated or kept the reference word. The kept, or remaining, reference word may be temporarily maintained in a scratch pad memory area in CPU 20, or in any other suitable memory for temporarily storing certain information. Next, CPU 20 determines whether any more reference words remain to be analyzed (step 675). In this example, the answer is "yes" because the reference words "get" and "jet" remain to be analyzed. In short, the execution of steps 635–670 for both of these reference words would result in their elimination at step 650 because the character sequence comparisons "b" and "g", and "b" and "j" reveal that neither "g" nor "j" are in the same confusion set as "b".

Thus, in step 685, out of all the originally generated reference words for the current misrecognized word "fet", only one reference word, "bet", is determined to remain. Each reference word that has survived elimination up to this point is referred to as a candidate reference word. Since only one candidate reference word remains in this example, CPU 20 replaces the misrecognized word "fet" with the candidate reference word "bet." Had more than one reference word been spared elimination, CPU 20 would have used a grammar check algorithm and possibly a natural language algorithm to narrow the set of candidate reference words to one reference word. This grammar checking algorithm is also commonly available in such typical word processing applications as WORDS® or WORDPERFECT®. The grammar checking algorithm analyzes the sentence in which the misrecognized word appears and determines what form of speech should occupy the text position of the misrecognized word. For example, if the sentence that includes the misrecognized word reads "I fet five dollars on the game," then for misrecognized word "fet", the grammar checking algorithm determines that the correct word is 90% likely to be a verb, 5% likely to be a noun, and 5% likely to be an adjective (step 705). The grammar checking algorithm is not limited to generating only probabilities for each part of speech; instead, the grammar checking algorithm is capable of generating other types of scores or values that reflect the relative likelihood of a particular word belonging to a particular part of speech. Thus, after generating probabilities for the various forms of speech, CPU 20 would rank the remaining (i.e., non-eliminated) reference words in accordance with their appropriate form of speech. In the present example, if the reference words "bet", "jet", and "get" were all spared from elimination, CPU 20 would assign the determined verb probability of 90% to both "bet" and "get" and the noun probability of 5% to "jet". For words such as "bet", which in isolation may be used as either a verb or a noun, the grammar checking algorithm may be designed to assign to such a word the higher of the grammar probabilities determined for the verb and noun forms of speech. If the reference word is capable of being used as a noun or adjective, but not as a verb, then the reference word is assigned the higher of the grammar probabilities determined for the noun and adjective forms of speech. The verb grammar probability could not be considered for such a reference word, even if it is higher than the noun and adjective grammar probabilities, because this reference word cannot be used as a verb.

Applying these principles to a group of remaining reference words, CPU 20 would select the reference word associated with the highest grammar probability. In this example, CPU 20 would have to select both "bet" and "get" because they both were associated with a grammar probability value of 90%. Since more than one reference words remain (step 710), CPU 20 could narrow the remaining reference words to one by applying a natural language algorithm maintained in module 55. Such a natural language algorithm may correspond to NL ASSISTANT™ natural language application by UNISYS CORPORATION. What is common to all of these natural language algorithms is that they each can flag words that, although grammatically correct, are nevertheless out of context. For example, if the recognized sentence is "I hit the baseball with my cat", neither the spell checking algorithm nor the grammar checking algorithm would determine that "cat" is incorrect and should be changed to "bat". Because the natural language algorithm analyzes the context within which each word appears, it would determine that the word "cat" does not belong in the sentence. In the present example, the natural language algorithm would analyze the remaining reference words "get" and "bet", along with the sentence "I fet five dollars on the game" in which one of these reference words is to replace the misrecognized word "fet", and select the word "bet" as being the more contextually correct of the remaining reference words (step 715). After using the natural language algorithm to select "bet", CPU 20 would then replace the misrecognized word "fet" with "bet".

FIG. 7 illustrates a flow diagram corresponding to another embodiment of the present invention. In this embodiment, when multiple reference words have been spared from elimination (as would be determined in step 685 of FIG. 6), CPU 20 ranks each of the remaining reference words according to an associative weighting that is calculated for each remaining reference word. As an alternative to the use of the grammar and natural language algorithms discussed above, associative weightings may also be used for narrowing a group of reference words to one replacement reference word. Thus, although numbered differently, the steps of FIG. 7 match those of FIG. 6 until the point at when CPU 20 determines that multiple reference words have not been eliminated by the reference word comparison procedure of steps 760–805 (steps 635–680 in FIG. 6). These reference words that have been spared from elimination may be referred to as candidate reference words.

An associative weighting is an expression of the relative likelihood that the particular reference word to which the weighting has been assigned matches the word of the original document 5 that the misrecognized word was intended to match. In order to generate an associative weighting for a particular reference word, a character member weighting must be assigned to each character member of the reference word. Although, as explained above, the term "character member" encompasses both individual characters and multi-character combinations, for the sake of simplicity it shall be assumed that the character members of the reference words comprise individual characters, and not any combination thereof.

The character weightings used to determine associative weightings are of two types: character change weightings and character identity weightings. Character change weightings reflect the average probability that a particular character member will be recognized as another character member of the same confusion set; character identity weightings reflect the average probability that a character member will be correctly recognized as itself. For reasons that shall soon become apparent, this second type of weighting is referred to as a "diagonal" weighting as well.

The procedure for determining associative weightings for each candidate reference word is represented as step 815 in FIG. 7. As is evident from this Figure, the assignment of associative weightings is carried out only when more than candidate reference word is present after the process of elimination in steps 760–800. In order to generate an associative weighting for a particular reference word, either a character change weighting or a character identity (or "diagonal") weighting must be assigned to each character member of each candidate reference word. Each confusion set is assigned a different character change weighting. Each confusion set may also be assigned a separate character identity weighting, or instead, an overall character weighting applicable to each confusion set may be used. The character change weighting assigned to each confusion set is an average of each of the confusion matrix values that reflect the respective probabilities that one character of the confusion set would be misrecognized as another character of the confusion set. For example, with respect to confusion set 1, CPU 20 would obtain from the confusion matrix maintained in memory 25 the probability that an A would be misrecognized by the OCR algorithm as an H, the probability that an A would be misrecognized as a K, the probability that an A would be misrecognized as an M, etc. CPU 20 would repeat this for every letter in the confusion set until the probabilities of recognizing any character as any other character within the same confusion set has been obtained from the confusion matrix. Once all these recognition probabilities are obtained from the confusion matrix, CPU 20 averages them and assigns this averaged value to confusion set 1. This value is the character change weighting for confusion set 1; the same process is repeated in order to generate character change weightings for each one of confusion sets 2–7. In the confusion sets of FIG. 5, assume that confusion set 1 is assigned a character change weighting of 0.70, confusion set 2 is assigned a character change weighting of 0.60, confusion set 3 is assigned a character change weighting of 0.40, confusion set 4 is assigned a character change weighting of 0.75 confusion set 5 is assigned a character change weighting of 0.45, confusion set 6 is assigned a character change weighting of 0.73, and confusion set 7 is assigned a character change weighting of 0.92.

A character identity weighting is an average of the confusion matrix probabilities that each particular character to which this weighting corresponds will be correctly recognized as itself. For instance, in confusion set 1, this character identity weighting would be the average of the probability that an A would be recognized as an A, the probability that an H would be recognized as an H, the probability that a K would be recognized as a K, etc. These probabilities are obtained from a confusion matrix that is associated with the OCR algorithm to be used, and the resulting character identity weighting is also referred to as a diagonal probability because the probabilities used to determine this weighting all lie along the diagonal leading from the top left hand corner to the bottom right hand corner of the confusion matrix. This calculation is carried out for each of the confusion sets, so that each confusion set is associated not only with a character change weighting, but also with a character identity weighting. Assume that in this example, confusion set 1 is associated with a character identity weighting of 0.91, confusion set 2 is assigned a character identity weighting of 0.95, confusion set 3 is assigned a character identity weighting of 0.93, confusion set 4 is assigned a character identity weighting of 0.95, confusion set 5 is assigned a character identity weighting of 0.94, confusion set 6 is assigned a character identity weighting of 0.96, and confusion set 7 is assigned a character identity weighting of 0.92. The character identity weighting and associated character change weighting for confusion set 7 are the same because each of these confusion sets includes only one character.

As an alternative, an overall, or global, character identity weighting may be calculated and applied to each of the confusion sets. This global character identity is the average of all of the probability values maintained along the above-mentioned diagonal of the confusion matrix, which reflects the probabilities of recognizing each individual character encompassed by the confusion matrix as itself. Once this global character identity weighting is determined, it is associated with each confusion set. Assume that in this example, the global character identity weighting is 0.96.

Returning to FIG. 7, CPU 20 would go to the first candidate reference word and compare it to the recognized word. In particular, CPU 20 would compare the character member in the first character sequence of the misrecognized word to the character member in the first character sequence of the current candidate reference word in order to determine whether they are different or the same (the determination of whether they belong to the same confusion set was made at step 770). If these character members are different, CPU 20 assigns to the character member of the candidate reference word the character change weighting associated with the character member's confusion set. Thus, if the current character member, which is determined to be different than the current character member of the misrecognized word, is from confusion set 3, then that character member is assigned a character change weighting of 0.40. CPU 20 would then compare the character member of the next character sequence in the misrecognized word to the character member of the next character sequence in the current candidate reference word. If these character members are the same, then CPU 20 assigns to the current character member of the candidate reference word the character identity weighting of the character member's confusion set. Alternatively, if a global character identity weighting is used, then the character member would be assigned that particular weighting instead. After repeating this process for each character sequence of the candidate reference word, the CPU 20 multiplies all of the character weightings obtained for that candidate reference word. The product of this multiplication is what is referred to as an associative weighting. This process is repeated for the remaining reference words, so that each candidate reference word is assigned an associative weighting.

After assigning an associative weighting to each candidate reference word in the manner described above, CPU 20 selects from this grouping a candidate reference word that matches the word in document 5. CPU 20 accomplishes this by selecting the candidate reference word associated with the highest associative weighting (step 820). It is this reference word that is used to replace the current misrecognized word (step 825). Presumably, this selected reference word should correspond to the word in document 5 to which the misrecognized word was intended to correspond. As an alternative, instead of selecting the candidate reference word with the highest associative weighting, CPU 20 may instead select the candidate reference words with the N highest associative weightings, or CPU 20 may select those candidate reference words associated with associative weightings that exceed an empirically determined threshold. The user may then be prompted with each of the candidate reference words selected in this fashion until the user provides a positive confirmation. An efficient way to prompt the user with these candidate reference words would be to first rank them in descending order according to their associative weightings, and then start the prompting procedure with the highest ranked candidate reference word.

An alternative way to determine associative weightings for reference words is to determine the difference between each reference word and associated misrecognized word in terms of character sequence. Thus, if the misrecognized word is "dat" and the reference words are "cat", "bet", and "gem", and assuming that each character sequence corresponds to an individual character position in the reference and misrecognized words, the misrecognized word "dat" would differ from reference word "cat" in only one character sequence, namely, the one corresponding to the first character position of both words. With respect to "dat" and "bet", these two would differ in two character sequences, and with respect to "dat" and "gem", they would differ from each other in three character sequences. The associative weighting assigned to each reference word would depend on the calculated character sequence differences between each reference word and the misrecognized word. Thus, those reference words that differ in only one character sequence from the misrecognized word would be assigned a higher associative weighting than those reference words that differ in two character sequences from the misrecognized word, and those reference words that differ in two character sequences from the misrecognized word would be assigned an associative weighting that is higher than the associative weighting assigned to reference words that differ from the misrecognized word in three character sequences, etc. The particular associative weighting values in this alternative would be determined empirically, based on trial runs measuring the accuracy of the OCR algorithm.

Figure 8:
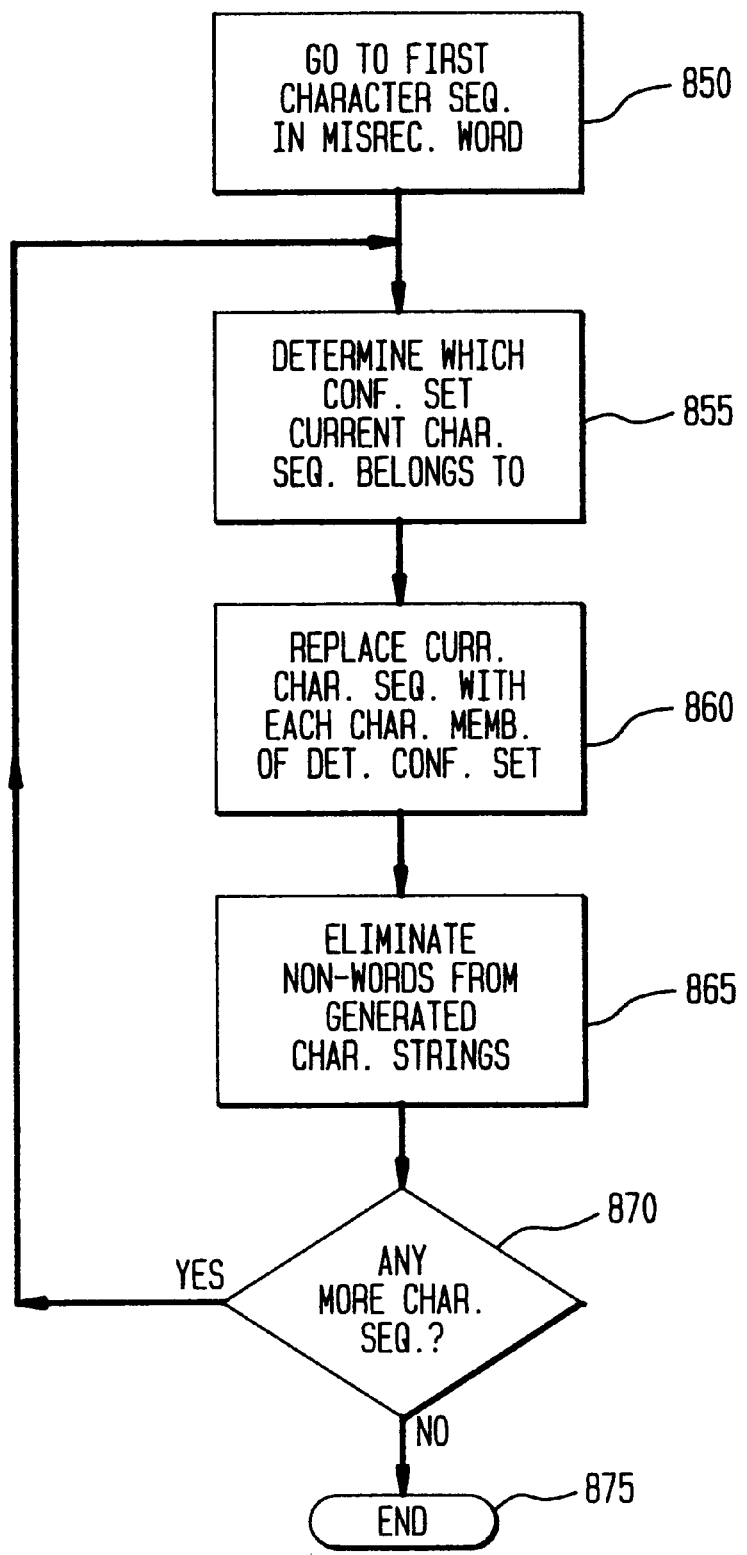
FIG. 8 illustrates a flow diagram illustrating a procedure for generating reference words, which is compatible with the procedures outlined in FIGS. 7 and 8.

FIG. 8 illustrates a flow diagram that represents an alternative procedure for generating reference words in response to the detection of a misrecognized word in the flow diagrams of FIGS. 6 and 7. The procedure presented in FIG. 8 would thus be performed as step 625 of FIG. 6 and step 750 of FIG. 7. As explained before, one way to generate reference words is to rely on any suitable spell checking, grammar checking, or natural language algorithm, each one of which generates at least one alternative word for each detected misspelled word. In FIG. 8, instead of generating reference words using the spell checking algorithm, which would still be used to detect the presence of misspelled words, CPU 20 would use the confusion sets, which prior to the implementation of system 100 were generated by confusion set generating module 65 and stored in confusion set memory 70, to determine the character arrangement of the reference words. In fact, since this procedure will initially generate some character arrangements that are not English words, being instead mere aggregation of characters, the term "character strings" shall be used to collectively refer to all those character arrangements initially generated by CPU 20.

After detecting a misspelled (i.e., misrecognized) word (either in step 615 of FIG. 6 or step 740 of FIG. 7), CPU 20 may be programmed to execute the procedure of FIG. 8 to generate at least one alternative word for the misrecognized word. As with the previous discussion, assume for the sake of simplicity that the character sequences have been set to be coterminous with individual character positions. CPU 20 initially goes to the first character sequence of the misrecognized word (step 850) and determines to which confusion set the current character sequence belongs (step 855). After doing so, CPU 20 replaces the current character sequence with each character member of the determined confusion set (860), each replacement producing a different character string. For example, for the misrecognized word "fet", the first character sequence, "f", is determined to belong to confusion set 2 of FIG. 5. Therefore, CPU 20 replaces the character seqeunce "f" with every character member of confusion set 2, producing the character strings "bet", "det", "ret", "pet", "8et", "3et", "eet", "5et", "i3et", "ioet", and "loet" (step 860). No other character member besides those in confusion set 2 would be used to replace the character sequence "f" because, by definition, each confusion set groups together those character members that are most likely confused with one another. Therefore, given this particular arrangement of confusion sets, which may vary depending on the type of OCR algorithm used, to replace the character sequence "f" with characters that are outside its particular confusion set would be counterproductive because reference words resulting from such substitutions would have only a negligible chance of actually being confused by the OCR algorithm for the corresponding word position in original document 5.

Returning to FIG. 8, CPU 20 then compares this generated set of character strings to a stored dictionary (which may be accessed from the spell checking module 45) to eliminate the non-words (step 865). If more character sequences remain to be analyzed in this manner (step 870), CPU 20 goes to the next character seqeunce and performs steps 855–865 again. After performing the procedure in FIG. 8, CPU 20 is left with a set of reference words that may be subjected to the further processing required by FIG. 6 or 7.

As is evident from this discussion, the present invention is broadly directed to a word correction system that replaces each misrecognized word with a word that most likely matches the corresponding word in an original document. This system is thus compatible with any recognition technique that is capable of generating a set of words from which the most likely replacement for the misrecognized word is selected. Moreover, as explained before, the present invention may be used in conjunction with a wide variety of applications for detecting misrecognized words. Thus, the present invention is capable of detecting misrecognized words on the basis of a spell checking algorithm, a grammar checking algorithm, a natural language algorithm, or any combination thereof.

The above described embodiments are illustrative of the principles of the present invention. Other embodiments could be devised by those skilled in the art

What is claimed is:

1. A method of recognizing at least one word in a document, the word including at least one predetermined character member, the method comprising the steps of:

a) providing a recognized word based on the word in the document;

b) determining whether the recognized word has been misrecognized;

c) providing, if the recognized word has been misrecognized, a set of reference words, each reference word comprising a different set of predetermined character members;

d) providing a plurality of confusion sets, each confusion set grouping together a different plurality of character members, a content of each confusion set being independent of the recognized word;

e) comparing at least one character sequence of the misrecognized word with a corresponding character sequence of a current one of the set of reference words to determine which corresponding character sequences do not include the same character members;

f) eliminating the current reference word if the character member of any character sequence of the misrecognized word does not correspond to the character member of the corresponding character sequence in the current reference word and if the character members from the corresponding character sequences in the misrecognized word and the current reference word are not from the same confusion set;

g) repeating steps e) and f) for each reference word of the set of reference words, the remaining non-eliminated reference words comprising a set of candidate reference words; and h) selecting one of the set of candidate reference words in accordance with a set of predetermined criteria, the selected candidate reference word comprising a replacement word for the misrecognized word.

2. The method according to claim 1, wherein each one of the at least one word in the document, the recognized word, and each reference word comprises at least one alphanumeric character.

3. The method according to claim 1, wherein each one of the at least one word in the document, the recognized word, and each reference word comprises at least one number.

4. The method according to claim 1, wherein each one of the at least one word in the document, the recognized word, and each reference word comprises at least one alphabetical letter.

5. The method according to claim 1, wherein each one of the at least one word in the document, the recognized word, and each reference word comprises at least one typographic character.

6. The method according to claim 1, wherein:
the step b) comprises determining whether the recognized word is spelled correctly.

7. The method according to claim 1, wherein:
the step b) comprises determining whether the recognized word comprises at least one of a correctly spelled word, a grammatically correct word, and a contextually correct word.

8. The method according to claim 1, wherein the confusion sets are derived from at least one confusion matrix.

9. The method according to claim 8, wherein each one of the at least one confusion matrix corresponds to a different font.

10. The method of claim 1, wherein the at least one word in the document comprises a printed word appearing on a physical document.

11. The method of claim 1, wherein the at least one word in the document comprises a handwritten word appearing on a physical document.

12. The method according to claim 1, wherein the recognized word is provided by an optical character recognition technique.

13. The method according to claim 1, wherein the step c) comprises:
  i) determining for each character sequence of the misrecognized word the confusion set to which the character member occupying the character sequence belongs;
  ii) replacing the character member in each character sequence with each character member of the corresponding confusion set determined in step i), each replacement operation producing a different character string; and
  iii) eliminating from the character strings those character strings comprising non-words, the remaining character strings corresponding to the set of reference words.

14. The method according to claim 1, wherein the step h) comprises:
  i) assigning to each candidate reference word a predetermined grammar probability;
  ii) reducing the set of candidate reference words to each reference word having the highest grammar probability; and
  iii) selecting, if more than one of the set of candidate reference words are associated with the highest grammar probability, the most contextually correct candidate reference word.

15. The method according to claim 1, wherein the step h) comprises:
  i) assigning an associative weighting to each one of the set of candidate reference words; and
  ii) selecting the reference word with the highest associative weighting.

16. The method according to claim 15, wherein the step i) comprises:
  iii) assigning a character change weighting and a character identity weighting to each one of the plurality of confusion sets
  iv) obtaining a first one of the set of candidate reference words;
  v) determining for each character sequence of the candidate reference word the confusion set to which the character member occupying the character sequence belongs;
  vi) determining for each character sequence of the candidate reference word whether the character member included therein is the same as the character member of the corresponding character sequence of the misrecognized word;
  vii) assigning to each character sequence of the candidate reference word one of the character change weighting and the character identity weighting of the confusion set associated with the character member occupying each character sequence of the candidate reference word;
  viii) determining an associative weighting for the candidate reference word on the basis of the character weightings assigned to each character sequence in step vii); and
  ix) repeating steps v)–viii) for each candidate reference word.

17. The method according to claim 16, wherein the step viii) comprises multiplying together each of the one of the character change weightings and character identity weightings assigned to each character sequence of the candidate reference word.

18. An apparatus for recognizing at least one word in a document, the word including at least one predetermined character member, the apparatus comprising:
  a) first means for providing a recognized word based on the word in the document;
  b) first means for determining whether the recognized word has been misrecognized;
  c) second means for providing, if the recognized word has been misrecognized, a set of reference words, each reference word comprising a different set of predetermined character members;
  d) third means for providing a plurality of confusion sets, each confusion set grouping together a different plurality of character members, a content of each confusion set being independent of the recognized word;
  e) means for comparing at least one character sequence of the misrecognized word with a corresponding character sequence of a current one of the set of reference words to determine which corresponding character sequences do not include the same character members;
  f) first means for eliminating any one of the set of reference words if the character member of any character sequence of the misrecognized word does not correspond to the character member of the corresponding character sequence in the reference word and if the character members from the corresponding character sequences in the misrecognized word and the reference word are not from the same confusion set, the remaining non-eliminated reference words comprising a set of candidate reference words; and
  g) means for selecting one of the set of candidate reference words in accordance with a set of predetermined criteria, the select candidate reference word comprising a replacement word for the misrecognized word.

19. The apparatus according to claim 18, wherein each one of the at least one word in the document, the recognized word, and each reference word comprises at least one alphanumeric character.

20. The apparatus according to claim 18, wherein each one of the at least one word in the document, the recognized word, and each reference word comprises at least one number.

21. The apparatus according to claim 18, wherein each one of the at least one word in the document, the recognized word, and each reference word comprises at least one alphabetical letter.

22. The apparatus according to claim 18, wherein each one of the at least one word in the document, the recognized word, and each reference word comprises at least one typographic character.

23. The apparatus according to claim 18, wherein:
  the first means for determining comprises means for determining whether the recognized word is spelled correctly.

24. The apparatus according to claim 18, wherein:
  the first means for determining comprises means for determining whether the recognized word comprises at least one of a correctly spelled word, a grammatically correct word, and a contextually correct word.

25. The apparatus according to claim 18, wherein the confusion sets are derived from at least one confusion matrix.

26. The apparatus according to claim 25, wherein each one of the at least one confusion matrix corresponds to a different font.

27. The apparatus of claim 18, wherein the at least one word in the document comprises a printed word appearing on a physical document.

28. The apparatus of claim 18, wherein the at least one word in the document comprises a handwritten word appearing on a physical document.

29. The apparatus according to claim 18, wherein the recognized word is provided by an optical character recognition technique.

30. The apparatus according to claim 18, wherein the second means for providing comprises:
   i) fourth means for determining for each character sequence of the misrecognized word the confusion set to which the character member occupying the character sequence belongs;
   ii) means for replacing the character member in each character sequence with each character member of the corresponding confusion set determined by the fourth means for determining, each replacement operation producing a different character string; and
   iii) second means for eliminating from the character strings those character strings comprising non-words, the remaining character strings corresponding to the set of reference words.

31. The apparatus according to claim 18, wherein the means for reducing comprises:
   i) means for assigning to each candidate reference a predetermined grammar probability;
   ii) means for reducing the set of candidate reference words to each reference word having the highest grammar probability; and
   iii) means for selecting, if more than one of the set of candidate reference words are associated with the highest grammar probability, the most contextually correct candidate reference word.

32. The apparatus according to claim 18, wherein the means for reducing comprises:
   i) first means for assigning an associative weighting to each one of the set of candidate reference words; and
   ii) means for selecting the reference word with the highest associating weighting.

33. The apparatus according to claim 32, wherein the means for assigning comprises:
   iii) second means for assigning one of a character change weighting and a character identity weighting to each one of the plurality of confusion sets
   iv) means for obtaining each one of the set of candidate reference words;
   v) fifth means for determining for each character sequence of the candidate reference word the confusion set to which the character member occupying the character sequence belongs;
   vi) sixth means for determining for each character sequence of the candidate reference word whether the character member included therein is the same as the character member of the corresponding character sequence of the misrecognized word;
   vii) third means for assigning to each character sequence of the candidate reference word one of the character change weighting and the character identity weighting of the confusion set associated with the character member occupying each character sequence of the candidate reference word; and
   viii) seventh means for determining an associative weighting for each candidate reference word on the basis of the character weightings assigned to each character sequence by the third means for assigning.

34. The apparatus according to claim 33, wherein the seventh means for determining comprises means for multiplying together each of the one of the character change weightings and character identity weightings assigned to each character sequence of each candidate reference word.

35. An apparatus for recognizing at least one word in a document, the word including at least one predetermined character, the apparatus comprising:
   a scanning device; and
   a processing device in communication with the scanning device, wherein the processing device comprises:
      a central processing unit,
      an optical character recognition module in communication with the centrol processing unit,
      a confusion matrix memory in communication with the central processing unit,
      a word checking module in communication with the central processing unit
      a confusion set generating module in communication with the central processing unit, each confusion set having a content that is independent of an input to the scanning device,
      a confusion set memory in communication with the central processing unit, and
      a word correction module in communication with the central processing unit.

36. The apparatus according to claim 35, wherein the word checking module comprises at least one of a spell checking module, a grammar checking module, and a natural language module.

37. The apparatus according to claim 36, wherein the processing device further comprises:
   a data input device in communication with the central processing unit; and
   a display device in communication with the central processing unit.

38. An apparatus, for recognizing at least one word in a document, the word including at least one predetermined character, the apparatus comprising:
   a scanning device; and
   a processing device in communication with the scanning device, wherein the processing device comprises:
      a central processing unit,
      an optical character recognition unit in communication with the central processing unit,
      a word checking module in communication with the central processing unit,
      a confusion set memory in communication with the central processing unit and provided with a plurality of predetermined confusion sets, each predetermined confusion set having a content that is independent of an input to the scanning device, and
      a word correction module in communication with the central processing unit.

39. The apparatus according to claim 38, wherein the word checking module comprises at least one of a spell checking module, a grammar checking module, and a natural language module.

40. The apparatus according to claim 38, wherein the processing device further comprises:
   a data input device in communication with the central processing unit; and
   a display device in communication with the central processing unit.

41. A method of recognizing at least one word in a document, the word including at least one predetermined character member, the method comprising the steps of:
   a) providing a recognized word based on the word in the document;
   b) determining whether the recognized word has been misrecognized;

c) providing, if the recognized word has been misrecognized, a set of reference words, each reference word comprising a different set of predetermined character members;

d) providing a plurality of confusion sets, each confusion set grouping together a different plurality of character members;

e) comparing at least one character sequence of the misrecognized word with a corresponding character sequence of a current one of the set of reference words to determine which corresponding character sequences do not include the same character members;

f) eliminating the current reference word if the character member of any character sequence of the misrecognized word does not correspond to the character member of the corresponding character sequence in the current reference word and if the character members from the corresponding character sequences in the misrecognized word and the current reference word are not from the same confusion set;

g) repeating steps e) and f) for each reference word of the set of reference words, the remaining non-eliminated reference words comprising a set of candidate reference words; and h) selecting one of the set of candidate reference words in accordance with a set of predetermined criteria, the selected candidate reference word comprising a replacement word for the misrecognized word, wherein the confusion sets are derived from at least one confusion matrix, and wherein the at least one confusion matrix is generated prior to deriving the plurality of confusion sets therefrom.

42. An apparatus for recognizing at least one word in a document, the word including at least one predetermined character member, the apparatus comprising:

a) first means for providing a recognized word based on the word in the document;

b) first means for determining whether the recognized word has been misrecognized;

c) second means for providing, if the recognized word has been misrecognized, a set of reference words, each reference word comprising a different set of predetermined character members;

d) third means for providing a plurality of confusion sets, each confusion set grouping together a different plurality of character members;

e) means for comparing at least one character sequence of the misrecognized word with a corresponding character sequence of a current one of the set of reference words to determine which corresponding character sequences do not include the same character members;

f) first means for eliminating any one of the set of reference words if the character member of any character sequence of the misrecognized word does not correspond to the character member of the corresponding character sequence in the reference word and if the character members from the corresponding character sequences in the misrecognized word and the reference word are not from the same confusion set, the remaining non-eliminated reference words comprising a set of candidate reference words; and g) means for selecting one of the set of candidate reference words in accordance with a set of predetermined criteria, the select candidate reference word comprising a replacement word for the misrecognized word, and wherein the at least one confusion matrix is generated prior to deriving the plurality of confusion sets therefrom.

43. The apparatus according to claim 35, wherein the confusion set generating module derives a plurality of confusion sets from a previously generated confusion matrix.

44. The apparatus according to claim 38, wherein the plurality of predetermined confusion sets are derived from a previously generated confusion matrix.

* * * * *